United States Patent
Nakagawa (10) Patent No.: US 8,355,161 B2
(45) Date of Patent: Jan. 15, 2013

(54) IMAGE ORDERING SYSTEM

(75) Inventor: Tomohiro Nakagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/485,322

(22) Filed: May 31, 2012

(65) Prior Publication Data
US 2012/0239528 A1    Sep. 20, 2012

Related U.S. Application Data

(63) Continuation of application No. 11/504,000, filed on Aug. 15, 2006, now Pat. No. 8,213,047.

(30) Foreign Application Priority Data

Aug. 30, 2005  (JP) .................................. 2005-249146

(51) Int. Cl.
*G06F 15/00* (2006.01)
*G06F 3/12* (2006.01)
*G06K 1/00* (2006.01)
*G06Q 30/00* (2006.01)
*H04N 1/00* (2006.01)

(52) U.S. Cl. ........... 358/1.6; 358/1.15; 358/403; 705/26

(58) Field of Classification Search .................... 358/1.1, 358/1.9, 1.13–1.16, 401–404, 407, 296, 1.6, 358/1.15; 705/26–28, 51; 707/3, 9, 10, 102, 707/104.1

See application file for complete search history.

(56) References Cited

U.S. PATENT DOCUMENTS

| | | | |
|---|---|---|---|
| 6,324,521 B1 * | 11/2001 | Shiota et al. ................. | 705/26.8 |
| 6,332,146 B1 | 12/2001 | Jebens et al. | |
| 6,628,417 B1 | 9/2003 | Naito et al. | |
| 7,259,879 B2 | 8/2007 | Yoshino | |
| 7,275,043 B2 | 9/2007 | Kinjo | |
| 7,298,520 B2 | 11/2007 | Ohkubo et al. | |
| 7,301,569 B2 | 11/2007 | Kinjo et al. | |
| 7,336,775 B2 * | 2/2008 | Tanaka et al. ............... | 379/93.17 |
| 7,424,460 B2 | 9/2008 | Ohta | |
| 7,536,306 B2 * | 5/2009 | Ogawa ......................... | 705/1.1 |
| 7,590,560 B2 | 9/2009 | Satomi et al. | |
| 7,617,279 B2 * | 11/2009 | Nakajima et al. ............. | 709/204 |
| 2003/0025933 A1 | 2/2003 | Kimura et al. | |
| 2003/0086706 A1 | 5/2003 | Kinjo | |
| 2005/0046894 A1 * | 3/2005 | Hagiwara et al. ............ | 358/1.15 |

FOREIGN PATENT DOCUMENTS

JP  2003-030517 A  1/2003

* cited by examiner

*Primary Examiner* — Twyler Haskins
*Assistant Examiner* — Jonathan Beckley
(74) *Attorney, Agent, or Firm* — Sughrue Mion, PLLC (57) ABSTRACT

An image ordering system includes an order management apparatus and an image providing apparatus. The order management apparatus includes a first image storage section, an order receiving section which receives an order for electronic-album-output of images, and an order information transmitting section which transmits order information to a contact address associated with ordered images. The image providing apparatus includes a second image storage section, an order information receiving section which receives the order information, an image searching section which searches the images stored in the second image storage section for images related to images indicated by the order information, and an image releasing section which releases the images found as a result of the search upon receiving a release permission.

12 Claims, 7 Drawing Sheets

IMAGE ORDERING SYSTEM

This application is a divisional of U.S. application Ser. No. 11/504,000, filed Aug. 15, 2006, which claims priority to JP 2005-249146, filed Aug. 30, 2005, each of which is incorporated herein by reference in its entirety.

BACKGROUND OF THE INVENTION

1. Field of the Invention

The present invention relates to an image ordering system which receives an order for printout of images.

2. Description of the Related Art

Conventionally, digital cameras which photograph subjects and thereby acquire photographic images have been used extensively. Laboratories and photo shops which digitize photographic images and print them out can provide services such as correcting flaws in the photographic images through predetermined image processing of the photographic images using a personal computer or the like. This provides customers the advantage of being able to store high quality images for a long period of time, and so on. Thus, in recent years, it has become common practice for laboratories and photo shops to optically read and digitize photographic images shot by a film camera and recorded on a film, before handling them.

Along with increasing digitization of photographic images, print ordering systems have come into use which store photographic images in image management servers and accept orders for printout of photographic images from personal computers, cell phones, or the like via a network. With such a print ordering system, for example, if a customer who orders photo prints requests a laboratory to release photographic images, the photographic image a are digitized, printed out, and stored in an image management server and the customer as well as friends and/or family members specified by the customer are notified of an access address of the photographic images stored in the image management server. The friends and/or family members of the customer can view the photographic images stored in the image management server using a personal computer, cell phone, or the like and order prints of desired photographic images out of the viewed photographic images. On the part of the laboratory, the print ordering system provides the advantage of being able to receive print orders riot only from the customer who brings photographic images in the laboratory and orders photo prints, but also from friends and family members of the customer, facilitating order placement. On the part of the customer, the print ordering system provides the advantage of being able to use the system as an electronic album to share photographic images with friends and/or family members and thereby communicate with people who live in remote locations.

Japanese Patent Laid-Open No. 2003-30517 describes a technique for providing higher-quality services to users who use a print ordering system more frequently. For example, during summer holidays or year-end and new-year holidays when many events are held, access concentrates on the image management server, making it necessary for users to wait before they can view photographic images. According to the technique described in Japanese Patent Laid-Open No. 2003-30517, users who frequently use the print ordering system on a regular basis receive preferential treatment in allocation of network resources and the like even during periods in which access concentrates on the image management server. This prevents incentives to use the print ordering system from being decreased.

However, although the technique described in Japanese Patent Laid-Open No. 2003-30517 increases utility value of the print ordering system for the users who frequently use the system because high-quality services are provided, it may degrade service quality for the users who use the system infrequently, which may further decrease the incentives to use the system.

SUMMARY OF THE INVENTION

The present invention has been made in view of the above circumstances and provides an image ordering system which can increase incentives of even those users who use the system infrequently.

The present invention provides an image ordering system including: an order management apparatus and an image providing apparatus. The order management apparatus includes:

a first image storage section which stores images, an order receiving section which receives an order for printout of images stored in the first image storage section from an ordering party, and an order information transmitting section which stores a contact address by associating the contact address with images stored in the first image storage section and transmits order information which represents the images and the ordering party to the contact address if the order receiving section receives an order for the images. Meanwhile, the image providing apparatus includes:

a second image storage section which stores images, an order information receiving section which receives the order information as the contact address or via the contact address, an image searching section which searches the images stored in the second image storage section for images related to images indicated by the order information, and an image releasing section which releases the images found by the image searching section to the ordering party indicated by the order information upon receiving a release permission.

Since digital photographic images can be stored compactly, large volumes of photographic images are sometimes buried disorderly in personal computers, cell phones, or the like. With the image ordering system according to the present invention, when the order management apparatus receives an order for printout of images stored in the first image storage section, the image providing apparatus searches images stored in the second image storage section for images related to the images ordered to be printed out and releases retrieved images to the ordering party. In this way, with the image ordering system according to the present invention, since images related to the ordered images are retrieved from large volumes of photographic images buried in the image providing apparatus and are released to the orderer, it is possible to communicate with people who live in remote locations by making efficient use of the images. This is expected to allow the order management apparatus to receive new print orders from the ordering party and the like that have viewed the released images, resulting in increased print orders. Also, the release of interesting images related to the ordered images will increase the incentives of the ordering party to use the image ordering system.

In the image ordering system according to the present invention, preferably:

the first image storage section stores the images released to the ordering party; and the image releasing section releases images by transmitting the images to the order management apparatus in order for the images to be stored in the first image storage section.

As the images permitted to be released are transmitted to the order management apparatus and stored in the first image storage section, the ordering party can view them.

Also, in the image ordering system according to the present invention, preferably:

the first image storage section stores both images released to the ordering party and images unreleased to the ordering party;

the order management apparatus further has a release status switching section which switches status of the images stored in the first image storage section between released status and unreleased status; and the image releasing section instructs the order management apparatus to make the release status switching section switch the status of images already stored as unreleased images in the first image storage section to released status if the same images are found by the image searching section.

As the status of images already stored as unreleased images in the first image storage section is switched to released status, it is possible to eliminate the wasteful process of transmitting the same images to the order management apparatus again and again, and thereby reduce communications traffic and communications cost.

Also, in the image ordering system according to the present invention, preferably:

the order receiving section also receives a special order to send printed-out images to an address other than an ordering party of the special order, and the image releasing section releases images by sending the order management apparatus the special order to print out unreleased images and send the printed-out unreleased images to the ordering party indicated by the order information.

The image ordering system according to the preferred embodiment of the present invention ensures that the user of the order management apparatus will receive increased orders for printout and provides the ordering party with printouts of interesting images other than the images ordered by the ordering party.

Also, in the image ordering system according to the present invention, preferably:

the image searching section recognizes image patterns in the images indicated by the order information and searches for images based on recognition results.

As the image patterns in images are recognized, it is possible to efficiently search for images likely to be interesting to the ordering party, such as images containing the same people or images shot at the same photo shooting location, and release the retrieved images to the ordering party.

Also, in the image ordering system according to the present invention, preferably:

the second image storage section saves images together with shooting information about shooting time at which the images are shot; and the image searching section searches for images containing shooting information about shooting time related to shooting time of the images indicated by the order information.

By searching for images based on shooting time, such as images shot during the same tour or images shot in the same season, it is also possible to release images interesting to the ordering party.

The present invention provides an image ordering system which can increase incentives of even those users who use the system infrequently.

DETAILED DESCRIPTION OF THE INVENTION

Embodiment of the present invention will be described below with reference to the drawings.

Essentially, computers treat images as image data and save them in files. However, image data are referred to herein simply as images.

Figure 1:
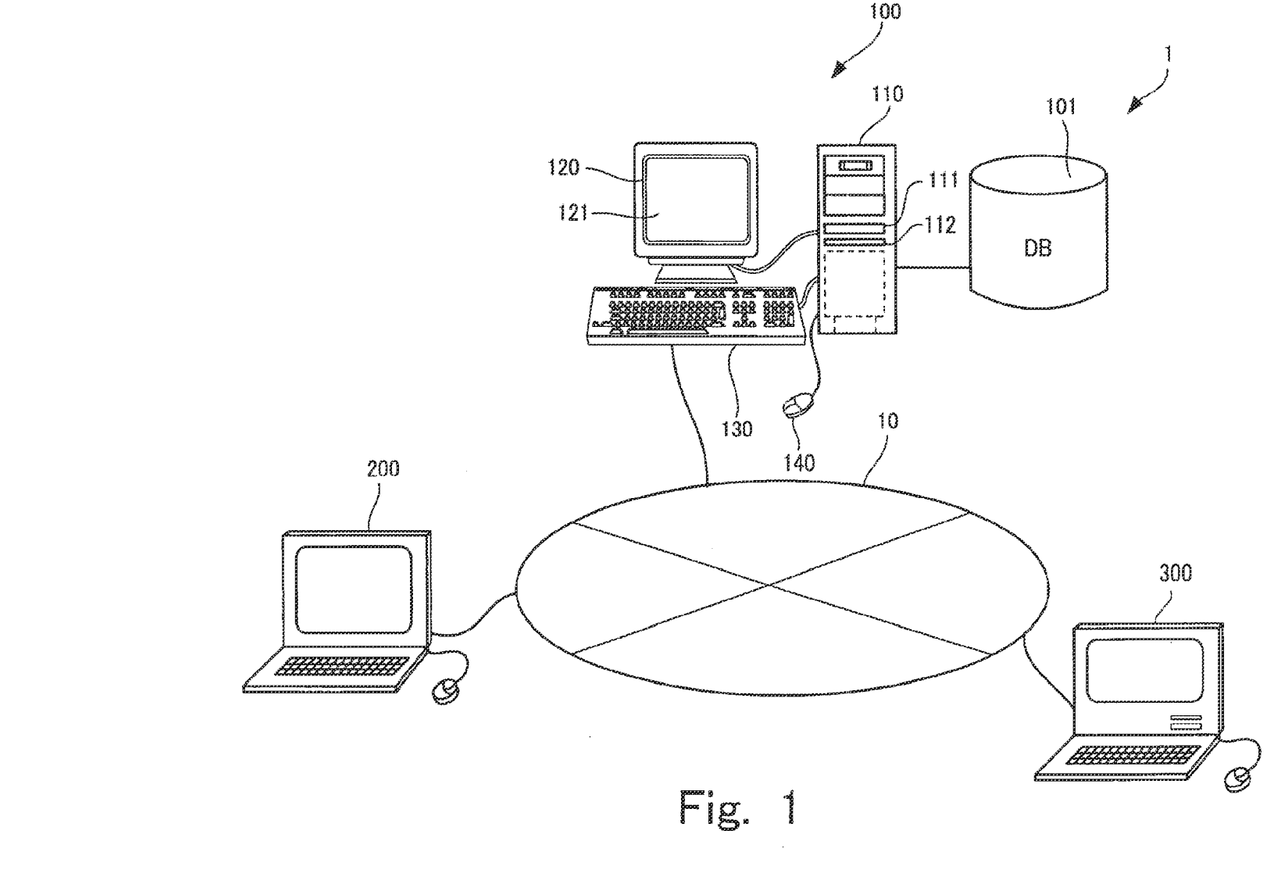
FIG. 1 is a diagram showing a print ordering system 1 which is an embodiment of the image ordering system according to the present invention.

FIG. 1 is a diagram showing a print ordering system 1 which is an embodiment of the image ordering system according to the present invention.

FIG. 1 shows a computer which constitutes an order management server 100 equipped with a database 101, computer which constitutes an image providing apparatus 200, and computer which constitutes an order placement apparatus 300. The order management server 100, image providing apparatus 200, and order placement apparatus 300 are connected with each other via a communications network 10.

When a user of the image providing apparatus 200, i.e., a provider who provides images to the order management server 100 orders printout of photographic images by bringing a recording medium or film in a laboratory, the photographic images on the recording medium or film are read optically and resulting digital photographic images are stored in the database 101. Also, the database 101 stores photographic images transmitted from the provider using the image providing apparatus 200 or a cell phone. The database 101 is an example of the first image storage section according to the present invention.

The order management server 100 is an example of the order management apparatus according to the present invention. It receives a print order for photographic images stored in the database 101 and makes a charge for the print order. The photographic images on which the print order is placed is printed out on a printer (not shown) connected to the order management server 100 and delivered to a specified delivery address.

The image providing apparatus 200 is an example of the image providing apparatus according to the present invention. It stores multiple photographic images. When photographic images stored in the image providing apparatus 200 are selected by a provider who operates the image providing apparatus 200, they are sent to the order management server 100 and stored in the database 101. Also, the provider notifies the order placement apparatus 300, which intends to permit access to the photographic images stored in the database 101, of a storage address which indicates a storage location of the photographic images via e-mail or the like. Actually two or more order placement apparatus may be notified of the storage address, but it is assumed herein for the sake of convenience that only the order placement apparatus 300 is notified of the storage address.

Upon notification of the storage address of the photographic images, the order placement apparatus 300 accesses the storage address and displays the photographic images stored in the database 101 on a display screen. When a user of the order placement apparatus 300, i.e., an orderer who places a print order with the order management server 100, selects photographic images to be printed out from among the photographic images displayed on the order placement apparatus 300, a print order for the selected photographic images is transmitted to the order management server 100.

Although the computer which constitutes the order management server 100, computer which constitutes the image providing apparatus 200, and computer which constitutes the order placement apparatus 300 differ in their operation, they have almost the same hardware configuration. The hardware configuration of the computer which constitutes the order management server 100 will be described below by representing these computers.

In terms of external configuration, the computer which constitutes the order management server 100 has a main device 110, image display apparatus 120 which displays images on a display screen 121 in response to instructions from the main device 110, keyboard 130 for use to input various information according to keystrokes into the main device 110, and mouse 140 for use to specify a desired location on the display screen 121 and thereby input a command corresponding to an icon or the like displayed at the specified location. When viewed from outside, the main device 110 is equipped with an FD slot 111 used to mount a flexible disk (hereinafter abbreviated to an FD) and a CD-ROM slot 112 used to mount a CD-ROM.

Figure 2:
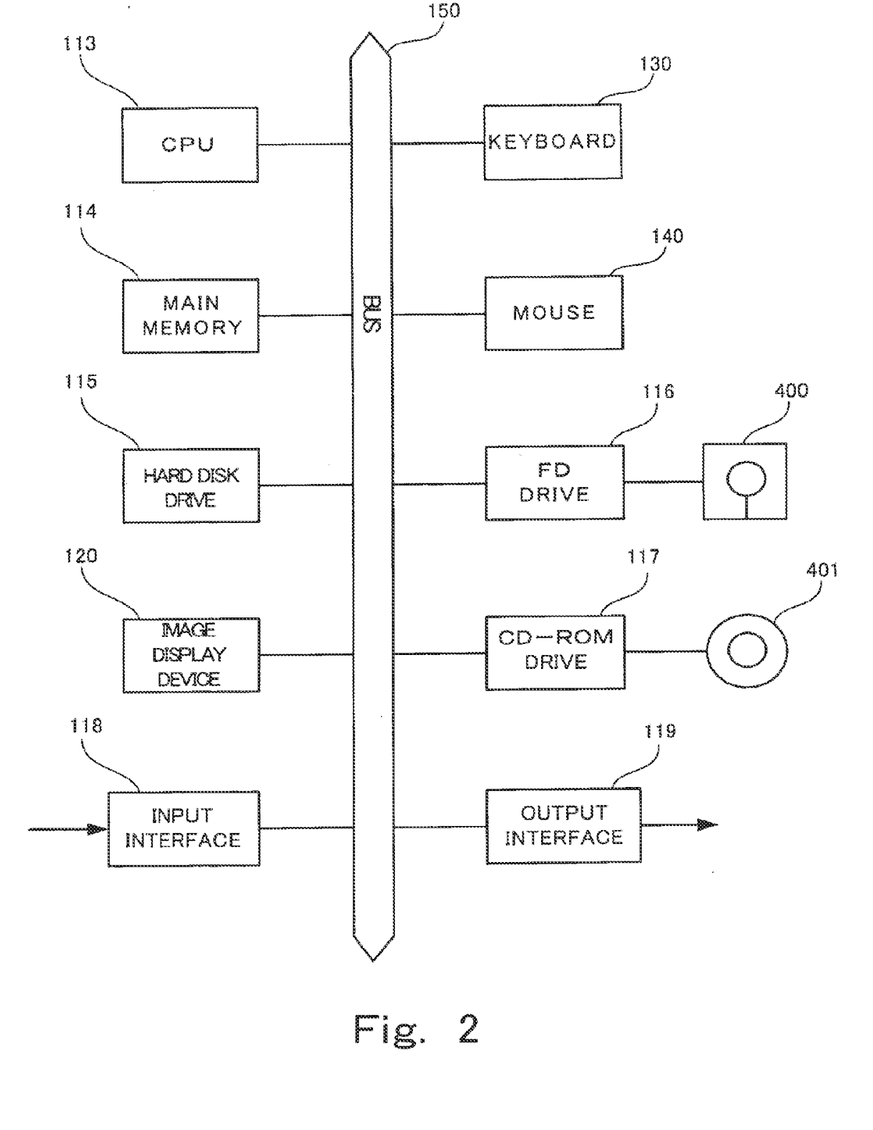
FIG. 2 is a diagram showing a hardware configuration of a computer shown in FIG. 1.

FIG. 2 is a diagram showing the hardware configuration of the computer shown in FIG. 1.

As shown in FIG. 2, the main device 110 contains a CPU 113 which runs various programs, a main memory 114 into which programs read out of a hard disk drive 115 are loaded for execution by the CPU 113, the hard disk drive 115 which stores various programs and data, an FD drive 116 which accesses an FD 400, a CD-ROM drive 117 which accesses a CD-ROM 401 mounted therein, an input, interface 118 for use to input images from external devices, and an output interface 119 for use to output images to external devices. These components as well as the image display device 120, keyboard 130, and mouse 140 also shown in FIG. 1 are interconnected via a bus 150. In the computer which constitutes the order management server 100, the hard disk drive 115 serves as the database 101.

The CD-ROM 401 stores a management program which makes the order management server 100 operate as an example of the order management apparatus according to the present invention. The CD-ROM 401 is mounted in the CD-ROM drive 117 and the management program stored in the CD-ROM 901 is uploaded onto the computer and stored in the hard disk drive 115. As the management program is started and executed, the order management server 100 operates as an example of the order management apparatus according to the present invention.

Instead of the CD-ROM 401 containing the management program, a CD-ROM 402 (see FIG. 3) containing a provision program is mounted on the computer which constitutes the image providing apparatus 200 and a CD-ROM 403 (see FIG. 3) containing an order placement program is mounted on the computer which constitutes the order placement apparatus 300.

Incidentally, although an order placement program provided specifically for use to view images stored in the database 101 of the order management server 100 and place print orders on the images is described herein, a general-purpose image viewing software may be used instead of the order placement program provided specifically or a provision program for an image providing apparatus 200 may be installed on the order placement apparatus 300.

Also, although the CD-ROMs 401, 402, 403 are cited as an example of storage media for use to store the management program, provision program, and order placement program, these programs may be stored not only on CD-ROMs, but also other storage media such as an optical disk, MO, FD, or magnetic tape. Besides, a data conversion program according to the present invention may be supplied directly to computers via the input interface 118 without using a storage medium.

Now, the management program, provision program, and order placement program will be described.

Figure 3:
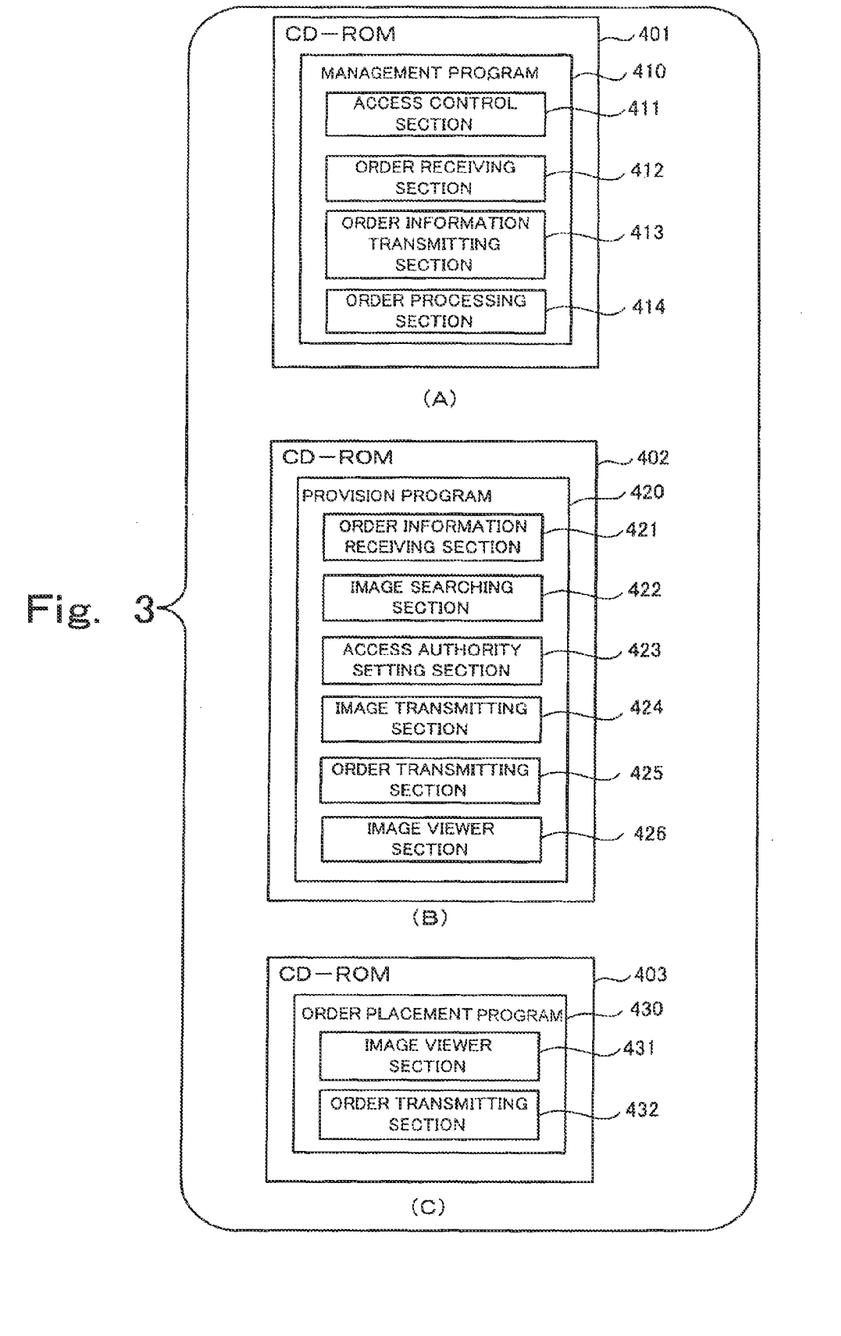
FIG. 3 is a conceptual diagram showing a CD-ROM 401 containing a management program, CD-ROM 402 containing a provision program, and CD-ROM 403 containing an order placement program.

FIG. 3 is a conceptual diagram showing the CD-ROM 401 containing the management program, CD-ROM 402 containing the provision program, and CD-ROM 403 containing the order placement program.

As shown in part (A) of FIG. 3, the management program 410 stored in the CD-ROM 401 consists of an access control section 411, order receiving section 412, order information transmitting section 413, and order processing section 414. As shown in part (B) of FIG. 3, the provision program 420 stored in the CD-ROM 402 consists of an order information receiving section 421, image searching section 422, access authority setting section 423, image transmitting section 424, order transmitting section 425, and image viewer section 426. As shown in part (C) of FIG. 3, the order placement program 430 stored in CD-ROM 403 consists of an image viewer section 431 and, order transmitting section 432.

Details of the management program 410, provision program 420, and order placement program 430 will be described together with operation of various parts of the order management server 100, image providing apparatus 200, and order placement apparatus 300.

Figure 4:
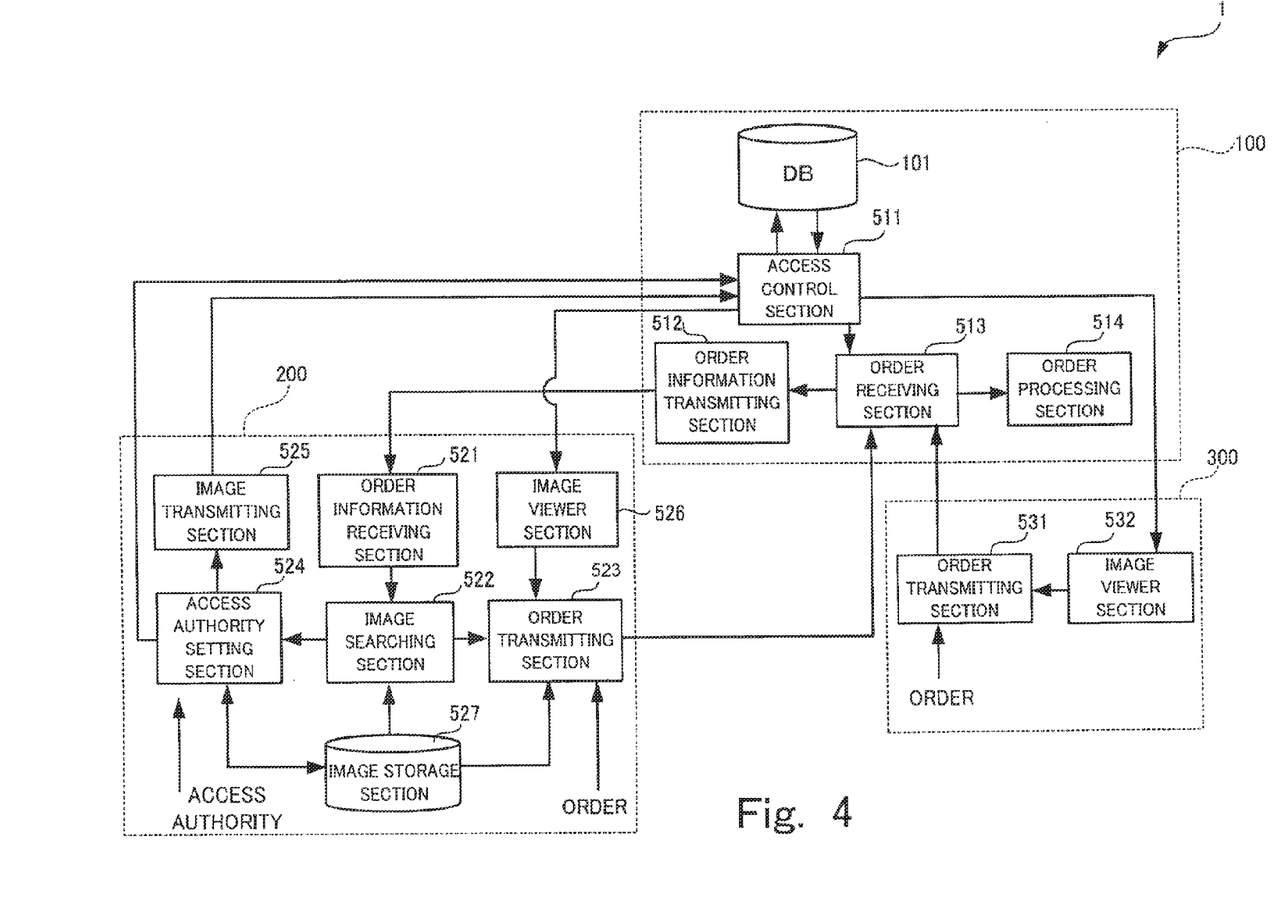
FIG. 4 is a functional block diagram of the print ordering system 1.

FIG. 4 is a functional block diagram of the print ordering system 1 constructed by installing the management program 410 in the computer which constitutes the order management server 100, provision program 420 in the computer which constitutes the image providing apparatus 200, and order placement program 430 in the computer which constitutes the order placement apparatus 300, all shown in FIG. 1.

The order management server 100 has the database 101 also shown in FIG. 1, an access control section 511, an order information transmitting section 512, an order receiving section 513, and an order processing section 514. The image providing apparatus 200 has an order information receiving section 521, image searching section 522, order transmitting section 523, access authority setting section 524, image transmitting section 525, image viewer section 526, and image storage section 527. The order placement apparatus 300 has an order transmitting section 531 and image viewer section 532.

The access control section 511, order information transmitting section 512, order receiving section 513, and order processing section 514 of the order management server 100 correspond respectively to the access control section 411, order information transmitting section 413, order receiving section 412, and order processing section 414 of the management program 410 shown in part (A) of FIG. 3. The order information receiving section 521, image searching section 522, order transmitting section 523, access authority setting section 524, image transmitting section 325, and image viewer section 526 of the image providing apparatus 200 correspond respectively to the order information receiving section 421, image searching section 422, order transmitting section 425, access authority setting section 423, image transmitting section 424, and image viewer section 426 of the provision program 420 shown in part (B) of FIG. 3. The order transmitting section 531 and image viewer section 532 of the order placement apparatus 300 correspond respectively to the order transmitting section 432 and image viewer section 431 of the order placement program 430 shown in part (C) of FIG. 3.

Whereas the components in FIG. 4 are constituted of a combination of computer hardware and an OS and application programs running on the computer, the components of the management program 410, provision program 420, and order placement program 430 shown in FIG. 3 are constituted of only application programs.

Incidentally, the photographic images handled in the print ordering system 1 carry contact addresses of providers who provide the photographic images (mail addresses of the providers, according to this embodiment) and shooting information about the dates on which the photographic images are shot. Also, a unique image number is assigned to each photographic image. Besides, the photographic are classified into those which the order placement apparatus 300 is only permitted to view, those which the order placement apparatus 300 is permitted to view and for which the order placement apparatus 300 is permitted to place print orders, and those which are not released to the order placement apparatus 300. View access is authorized to the photographic images which are only permitted to be viewed and print access is authorized to the photographic images for which print orders are permitted to be placed.

The image viewer section 532 of the order placement apparatus 300 shown in FIG. 4 conveys a request to view images saved in the database 101 to the order management server 100 and displays the photographic images permitted to be viewed, on a display screen of the computer of the order placement apparatus 300. The orderer who operates the order placement apparatus 300 places a print order by selecting photographic images to be printed out from among the photographic images displayed on the display screen using a mouse or the like. The order transmitting section 531 transmits order information containing the image numbers of the respective photographic images for which the print order is placed by the orderer, the number of the photographic images to be printed, delivery address to which the photographic images printed out are to be delivered, and e-mail address of the orderer to the order management server 100.

The image storage section 527 of the image providing apparatus 200 stores multiple photographic images. Its role is assumed by the hard disk drive of the computer which constitutes the image providing apparatus 200. The image storage section 527 is an example of the second image storage section according to the present invention.

As in the case of the image viewer section 532 of the order placement apparatus 300, the image viewer section 526 of the image providing apparatus 200 conveys a request to view photographic images saved in the database 101 to the order management server 100 and displays the photographic images permitted to be viewed, on a display screen of the image providing apparatus 200. The image providing apparatus 200 is given permission to view all the photographic images provided by the provider who operates the image providing apparatus 200.

The order information transmitted from the order placement apparatus 300 to the order management server 100 is transferred to the order information receiving section 521. The order information receiving section 521 conveys the image numbers contained in the order information to the image searching section 522. The order information receiving section 521 is an example of the order information receiving section according to the present invention.

The image searching section 522 searches the photographic images stored in the image storage section 527 for photographic images related to the photographic images which are assigned the image numbers conveyed from the order information receiving section 521. The retrieved photographic images are displayed on the display screen of the image providing apparatus 200. The image numbers assigned to the retrieved photographic images are conveyed to the access authority setting section 524 and order transmitting section 523. The image searching section 522 is an example of the image searching section according to the present invention.

The provider who operates the image providing apparatus 200 confirms the photographic images displayed on the display screen of the image providing apparatus 200 and enters a command using a mouse or the like to authorize/unauthorize print access or view access to the photographic images. In response to the entered command, the access authority setting section 524 authorizes/unauthorizes print access or view access to the photographic images. If the photographic images are already stored in the database 101 of the order management server 100, the access authority setting section 524 conveys to the order management server 100 the command to authorize/unauthorize print access or view access.

The image transmitting section 525 transmits the photographic images to which print access or view access is newly authorized by the access authority setting section 524 to the order management server 100.

The image providing apparatus 200 can also place print orders for photographic images stored in the database 101. When the provider who operates the image providing apparatus 200 places a print order by selecting photographic images to be printed out from among the photographic images displayed on the display screen using a mouse or the like, the order transmitting section 523 transmits order information containing the image numbers of the respective photographic images for which the print order is placed by the provider, the number of the photographic images to be printed, delivery address to which the photographic images printed out are to be delivered, and e-mail address of the provider to the order management server 100. Also, the image providing apparatus 200 can place a special order to print out the images found by the image searching section 522 and deliver them to the delivery address on the order placement apparatus 300. On instructions from the provider, the order transmitting section 523 transmits special order information containing the image numbers of the photographic images found by the image searching section 522, the number of the photographic images to be printed, and delivery address on the order placement apparatus 300 to the order management server 100.

The access authority setting section 524, image transmitting section 525, and order transmitting section 523 are examples of the image releasing section according to the present invention.

The access control section 511 of the order management server 100 controls access to the photographic images stored in the database 101. Specifically, when the order placement apparatus 300 makes a request to view photographic images stored in the database 101, the access control section 511 acquires the photographic images to which view access or print access is authorized from the database 101 and provides them to the order placement apparatus 300. Upon receiving a view request from the image providing apparatus 200, the access control section 511 provides all the photographic images provided by the provider to the image providing apparatus 200 regardless of the type of access authorized to the photographic images. When photographic images are sent from the image providing apparatus 200, the access control section 511 saves the photographic images in the database 101. Upon receiving a command to authorize or unauthorize view access or print access from the image providing apparatus 200, the access control section 511 authorizes or unauthorizes the specified type of access to the photographic images stored in the database 101. The access control section 511 is an example of release status switching section according to the present invention.

The order receiving section 513 receives order information or special order information from the order placement apparatus 300 or image providing apparatus 200. The order information and special order information are conveyed to the order processing section 514. On the other hand, the order information sent from the order placement apparatus 300 is also conveyed to the order information transmitting section 512. The order receiving section 513 is an example of the order receiving section according to the present invention.

The order information transmitting section 512 transfers the order information sent from the order placement apparatus 300 to the contact address of provider who provides the photographic images (mail addresses of the provider) which are assigned the image numbers indicated by the order information. The order information transmitting section 512 is an example of the order information transmitting section according to the present invention.

The order processing section 514 conveys a command to print out the photographic images of the image numbers indicated by the order information and special order information to a printer connected in a subsequent stage and works out a bill for the prints of the photographic images. The photographic images printed out are delivered to the delivery addresses indicated by the order information and special order information.

The print ordering system 1 is configured as described above.

Next, a flow of print ordering in the print ordering system 1 will be described.

Figure 5:
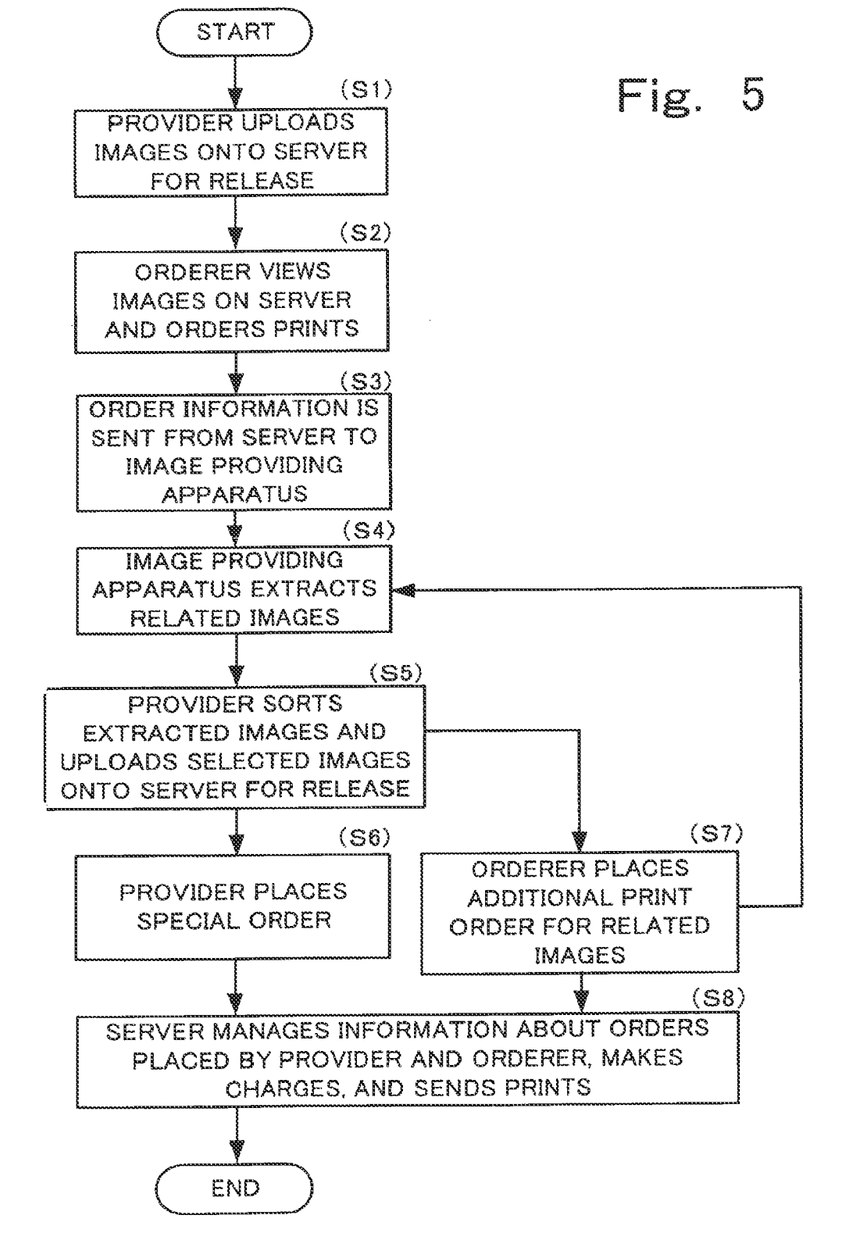
FIG. 5 is a flowchart showing a flow of print ordering in the print ordering system 1.
Figure 6:
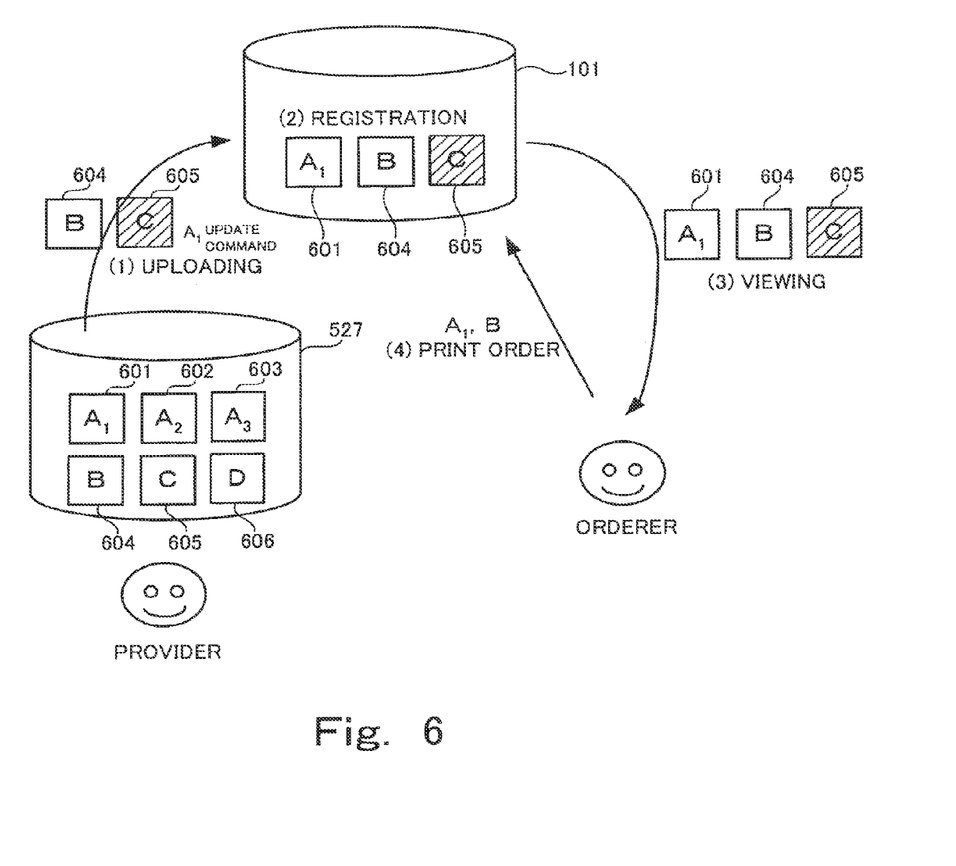
FIG. 6 is a diagram illustrating relationships between various processes and photographic images in print ordering.
Figure 7:
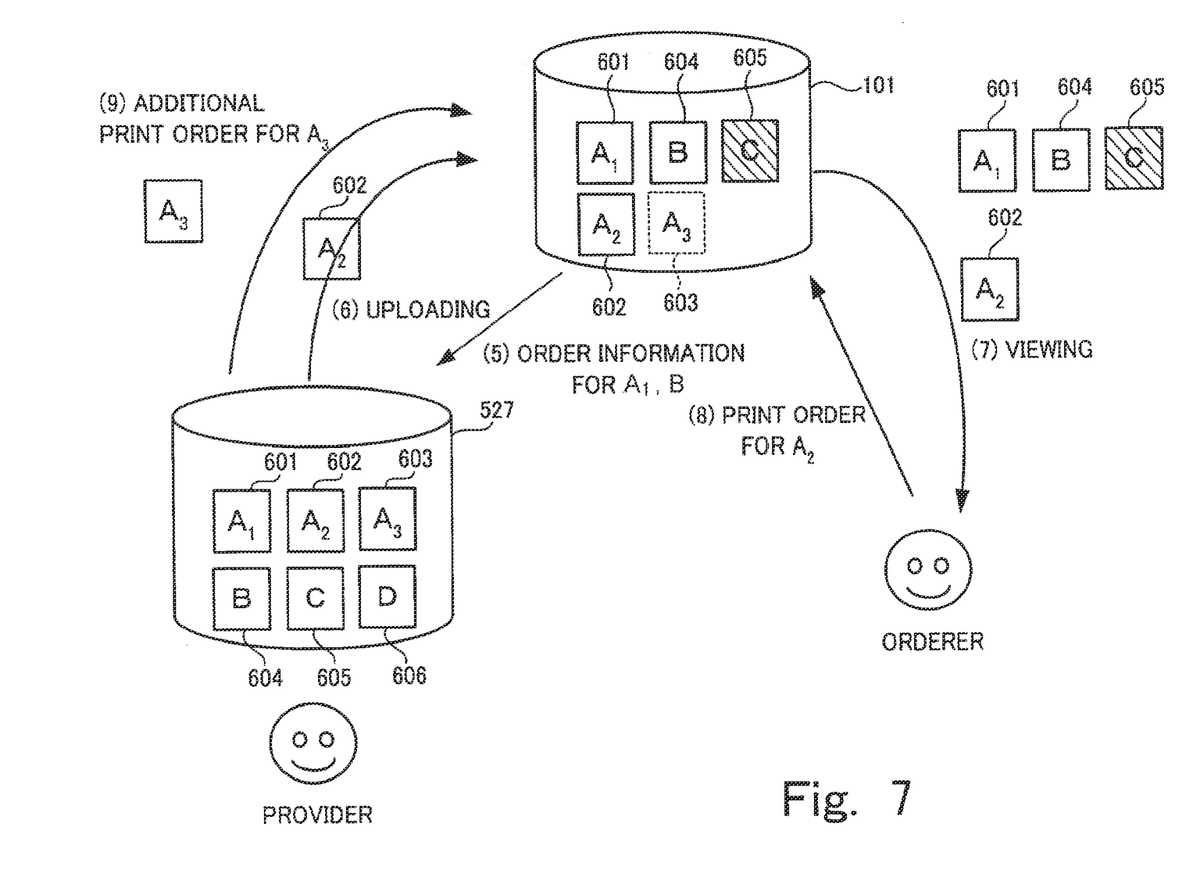
FIG. 7 is a diagram illustrating relationships between various processes and photographic images in print ordering.

FIG. 5 is a flowchart showing a flow of print ordering in the print ordering system 1. FIGS. 6 and 7 are diagrams illustrating relationships between various processes and photographic images in print ordering. Incidentally, description will be given below with reference to not only FIGS. 5, 6, and 7, but also FIG. 4.

It is assumed here that a photographic image 601 containing an image pattern "A1" is stored in the database 101 after being brought in a laboratory by a provider via a recording medium and that six photographic images (a photographic image 601 containing an image pattern "A1", photographic image 602 containing an image pattern "A2", photographic image 603 containing an image pattern "A3", photographic image 604 containing an image pattern "B", photographic image 605 containing an image pattern "C", and photographic image 606 containing an image pattern "D") are stored in the image storage section 527 of the image providing apparatus 200. For convenience of description, the photographic images are denoted by 601_A1, 602_A2, 603_A3, 604_B, 605_C, 606_D with a suffix which denotes the image pattern being attached to their reference numerals 601, 602, 603, 604, 605, 606. Also, it is assumed that neither view access nor print access is authorized initially to any of the photographic images 601_A1, 602_A2, 603_A3, 604_B, 605_C, and 606_D. In FIGS. 6 and 7, the photographic images to which only view access is authorized (i.e., print access is not authorized) are shaded to distinguish them from photographic images to which print access is authorized and images to which neither view access nor print access is authorized.

First, by operating the image providing apparatus 200, the provider selects photographic images which the orderer is to be permitted to view or print from among the six photographic images 601_A1, 602_A2, 603_A3, 604_B, 605_, 606_D stored in the image storage section 527. In the example of FIG. 6, it is assumed that the provider gives commands to permit only viewing of the photographic image 605_C containing the image pattern "C" and permit both viewing and print ordering of the photographic image 601_A1 containing the image pattern "A1" and photographic image 604_B containing the image pattern "B".

In response to the instructions from the provider, the access authority setting section 524 shown in FIG. 4 authorizes view access to the photographic image 605_C which is permitted to be viewed and authorizes print access to the photographic images 601_A1 and 604_B for which print orders are permitted to be placed. Since the photographic image 601_A1 containing the image pattern "A1" is prestored in the database 101, the access authority setting section 524 instructs the order management server 100 to authorize print access to the photographic image 601_A1. The photographic image 604_B containing the image pattern "B" and photographic image 605_C containing the image pattern "C", which are not stored in the database 101, are transmitted to the order management server 100 via the image transmitting section 525. In this way, if photographic images in question are already stored in the order management server 100, only instructions to update access authority are transmitted to eliminate the process of transmitting the same images to the order management apparatus again and again, and thereby reduce communications traffic and communications cost.

The access control section 511 of the order management server 100 stores the two photographic images 604_B and 605_C sent from the image providing apparatus 200 in the database 101 and authorizes print access to the photographic image 601_A1 already stored in the database 101. Consequently, the three photographic images 601_A1, 604_B, 605_C stored in the database 101 are released to the order placement apparatus 300, making them viewable from the order placement apparatus 300 (step S1 in FIG. 5).

When an orderer makes a request to view photographic images by operating the order placement apparatus 300, the image viewer section 532 shown in FIG. 4 conveys the request to view photographic images saved in the database 101 to the order management server 100.

Out of the photographic images saved in the database 101, the access control section 511 of the order management server 100 permits viewing of the photographic image 605_C with the image pattern "C", to which view access is authorized, and permits viewing and print ordering of the photographic image 601_A1 with the image pattern "A1" and photographic image 604_B with the image pattern "B", to which view access and print access are authorized.

The image viewer section 532 of the order placement apparatus 300 displays the photographic images 601_A1, 604_B, and 605_C to which view access is authorized on the display screen of the order placement apparatus 300. The orderer confirms the displayed photographic images 601_A1, 604_B, and 605_C and selects an image desired to be printed out from among the photographic images 601_A1 and 604_B to which print access is authorized using a mouse or the like. In the example of FIG. 6, it is assumed that the orderer places a print order for both photographic images 601_A1 and 604_B. The order transmitting section 531 transmits order information to the order management server 100, with the order information containing the image numbers of the respective photographic images 601_A1 and 604_B specified by the orderer to be printed, the number of the photographic images to be printed, the delivery address to which the photographic images printed out should be delivered, and e-mail address of the order placement apparatus 300 (step S2 in FIG. 5).

The order receiving section 513 of the order management server 100 receives the order information from the order placement apparatus 300 and conveys the order information to the order processing section 514 and order information transmitting section 512. The order information transmitting section 512 transfers the order information to the contact address attached to the ordered photographic images (mail addresses of the provider) (step S3 in FIG. 5).

The order information receiving section 521 of the image providing apparatus 200 receives order information via a mail server (not shown) and conveys the order information to the image searching section 522. The image searching Section 522 searches the photographic images stored in the image storage section 527 for photographic images related to the photographic images which are assigned the image numbers indicated by the order information. In this example, the image numbers of the photographic images 601_A1 and 604_B are indicated by the order information, and thus the image searching section 522 searches the photographic images 601_A1, 602_A2, 603_A3, 604_B, 605_C, 606_D stored in the image storage section 527 for photographic images related to the photographic images 601_A1 and 604_B.

First, the image patterns of the ordered photographic images 601_A1 and 604_B are recognized and photographic images are searched for based on the image patterns. For example, human faces in the photographic images 601_A1 and 604_B are recognized and then using the recognized human faces as keys, photographic images containing the keys are searched for. Beside human faces, possible keys include, the sex, age, and race of persons, scenery such as the sea or mountains, tourist sites such as Mt. Fuji or Lake Biwa, the times determined from a signboard or the like shown in the photographic images, lightness or coloration of the images, etc. Since known image recognition techniques are available, detailed description thereof will be omitted herein.

Next, shooting dates indicated by shooting information attached to the photographic images 601_A1, 602_A2, 603_A3, 604_B, 605_C, and 606_D are acquired and photographic images shot at times (on the same day, according to this embodiment) related to shooting time of the ordered photographic images 601_A1 and 604_B are searched for.

Furthermore, if information about photo shooting locations detected by GPS or the like is attached to the photographic images 601_A1, 602_A2, 603_A3, 604_B, 605_C, and 606_D, photographic images shot near the photo shooting locations of the ordered photographic images 601_A1 and 604_B are searched for. If information about the photographer of the photographic images 601_A1, 602_A2, 603_A3, 604_B, 605_C, and 606_D is attached, photographic images shot by the same photographer as the ordered photographic images 601_A1 and 604_B are searched for.

By performing searches based on image patterns, shooting dates, photo shooting locations, and the like in this way, it is possible to efficiently acquire photographic images which are related to photographic images ordered to be printed and which are likely to suit the taste of the orderer.

In this embodiment, it is assumed that two photographic images 602_A2, 603_A3 are retrieved as photographic images related to the ordered photographic image 601_A1. The retrieved photographic images 602_A2, 603_A3 are displayed on the display screen of the image providing apparatus 200 (step S4 in FIG. 5).

The provider confirms the displayed photographic images 602_A2 and 603_A3 and enters a command to authorize print access or view access to the photographic images 602_A2 and 603_A3 using the mouse or the like of the image providing apparatus 200. In the example of FIG. 7, it is assumed that a command to authorize print access only to the photographic image 602_A2 is entered. In response to the entered command, the access authority setting section 524 authorizes print access to the photographic image 602_A2. The photographic image 602_A2 with access authority updated is transmitted from the image transmitting section 525 to the order management server 100.

The photographic image 602_A2 sent to the order management server 100 goes through the same process as in step S1, and then it is stored in the database 101 and released to the order placement apparatus 300 (step S5 in FIG. 5).

On instructions from the orderer, the same process as in step S2 is performed and the newly stored photographic image 602_A2 is displayed on the display screen of the order placement apparatus 300 in addition to the photographic images 601_A1, 604_B, and 605_C displayed in step S2. The photographic image 602_A2, which is related to the photographic image 601_A1 ordered by the orderer to be printed, is likely to suit the taste of the orderer and additional print orders are expected to be placed by the orderer. When the orderer places a print order, order information about the print order for the photographic image 602_A2 is transmitted to the order management server 100 (step S7 in FIG. 5).

In step S5, the provider enters a command to place a special order to print out the photographic image 603_A3 to which access is not authorized and deliver the printed photographic image 603_A3 to the orderer. The image transmitting section 525 sends the order management server 100 the photographic image 603_A3 to which access is not authorized, and the order transmitting section 523 of the image providing apparatus 200 transmits special order information containing the image number of the photographic image 603_A3, the number of prints, and delivery address of the orderer contained in the order information to the order management server 100 (step S6 in FIG. 5).

The order information transmitting section 512 conveys the special order information sent from the image providing apparatus 200 to the order processing section 514.

The order processing section 514 conveys the command to print out the photographic images of the image numbers indicated by the order information or additional order information sent from the order placement apparatus 300 and the special order information sent from the image providing apparatus 200 to the printer in order for the printer to print out the photographic images. The photographic images printed out are delivered to the delivery addresses of the orderers indicated by the order information and special order information. Also, the order processing section 514 charges the orderer for the prints based on the order information or additional order information and charges the provider for the prints based on the special order information (step S8 in FIG. 5).

If photographic images are printed out and provided to the orderer in this way, the provider can present photographic images likely to be interesting to the orderer and the user of the order management server can be ensured of increased orders.

Although a personal computer has been used as an example of the image providing apparatus according to the present invention, the image providing apparatus according to the present invention and the order placement apparatus according to the invention used by the ordering party may be cell phones.

Also, although in the example described above, retrieved photographic images are provided from the image providing apparatus 200 to the order placement apparatus 300 via the order management server 100, the image providing section according to the present invention may release the images directly to the order placement apparatus by attaching them to e-mail or the like.

Also, although in the example described above, the provider's e-mail address is attached to images and order information is conveyed to the image providing apparatus via the mail server, the order information may be conveyed directly to the image providing apparatus by attaching an IP address of the image providing apparatus as a contact address in the present invention.

What is claimed is:

1. An image ordering system comprising:
    an order management apparatus comprising:
        a first image storage section which stores a first plurality of images,
        an order receiving section which receives an order for an electronic-album-output of one of the first plurality of images stored in the first image storage section from an ordering party,
        an order information transmitting section which stores a first plurality of contact addresses by associating the first plurality of contact addresses with the first plurality of images respectively and transmits order information, which represents the one of the first plurality of images and the ordering party, to one of the first plurality of contact addresses which is associated with the one of the first plurality of images when the order receiving section receives the order for the one of the first plurality of images, and
        an order processing section which charges the ordering party for the electronic-album-output of the one of the first plurality of images ordered by the ordering party, and
    an image providing apparatus comprising:
        a second image storage section which stores a second plurality of images which includes same images as the first plurality of images,
        an order information receiving section which receives the order information transmitted by the order information transmitting section to the one of the first plurality of contact addresses,
        an image searching section which searches, after the order information receiving section receives the order information, the second plurality of images stored in the second image storage section for other images related to the one of the first plurality of images represented by the order information, the other images being different from the one of the first plurality of images represented by the order information, and
        an image releasing section which releases the other images found by the image searching section to the ordering party represented by the order information upon receiving a release permission,
    wherein
        the order information receiving section conveys the order information to the image searching section,
        the conveyance of the order information to the image searching section by the order information receiving section causes, without any additional instructions by the ordering party or a user of the image providing apparatus to search for the other images, the image searching section to search for the other images, and
        when the order receiving section receives, after the other images found by the image searching section are released to the ordering party, an additional order from the ordering party for electronic-album-output of any of the other images, the order processing section charges the ordering party for the electronic-album-output of the any of the other images.

2. The image ordering system according to claim 1, wherein the first image storage section stores any of the first plurality of images to be released to the ordering party, and
    the image releasing section releases the other images by transmitting the other images to the order management apparatus in order for the other images to be stored, as the any of the first plurality of images to be released to the ordering party, in the first image storage section.

3. The image ordering system according to claim 1, wherein the first image storage section stores, as the first plurality of images, both images to be released to the ordering party and images to be unreleased to the ordering party,
    the order management apparatus further comprises a release status switching section which switches status of the first plurality of images stored in the first image storage section between released status and unreleased status, and
    the image releasing section instructs the order management apparatus to make the release status switching section switch status of an image of the first plurality of images which has already been stored as an unreleased image in the first image storage section to released status if a same image as the image of the first plurality of images which has already been stored as the unreleased image exists among the other images found by the image searching section.

4. The image ordering system according to claim 1, wherein
    the image releasing section releases one of the other images to the ordering party by sending the order management apparatus a special order to generate the electronic-album-output of the one of the other images and send the electronic-album output of one of the other images to the ordering party as well as by sending the one of the other images to the order management apparatus, and
    the order processing section charges a user, who operates the image providing apparatus, for the electronic-album-output of the one of the other images by the special order of the image releasing section.

5. The image ordering system according to claim 1, wherein the image searching section recognizes image patterns in a same image of the second plurality of images as the one of the first plurality of images represented by the order information and searches for the other images based on the recognition.

6. The image ordering system according to claim 1, wherein the second image storage section saves each of the second plurality of images together with shooting information about a shooting date on which the each of the second plurality of images is shot, and
the image searching section searches for the other images containing shooting information whose shooting dates are same as that of shooting information of a same image of the second plurality of images as the one of the first plurality of images represented by the order information.

7. The image ordering system according to claim 1, wherein the second image storage section saves each of the second plurality of images together with shooting information about a shooting location where the each of the second plurality of images is shot, and
the image searching section searches for the other images containing shooting information whose shooting locations are near that of shooting information of a same image of the second plurality of images as the one of the first plurality of images represented by the order information.

8. The image ordering system according to claim 1, wherein the second image storage section saves each of the second plurality of images together with shooting information about a photographer by whom the each of the second plurality of images is shot, and
the image searching section searches for the other images containing shooting information whose photographers are same as that of shooting information of a same image of the second plurality of images as the one of the first plurality of images represented by the order information.

9. The image ordering system according to claim 1, wherein the release permission is given to the image releasing section when it is determined that same images of the first plurality of images as the other image have not yet been released from the first image storage section.

10. An order management apparatus that is included in an image ordering system having an image providing apparatus, wherein the order management apparatus comprises:
a first image storage section which stores a first plurality of images,
an order receiving section which receives an order for electronic-album-output of one of the first plurality of images stored in the first image storage section from an ordering party,
an order information transmitting section which stores a first plurality of contact addresses by associating the first plurality of contact addresses with the first plurality of images respectively and transmits order information, which represents the one of the first plurality of images and the ordering party, to one of the first plurality of contact addresses which is associated with the one of the first plurality of images when the order receiving section receives the order for the one of the first plurality of images, and
an order processing section which charges the ordering party for the electronic-album-output of the one of the first plurality of images ordered by the ordering party,
wherein the image providing apparatus comprises:
a second image storage section which stores a second plurality of images which includes same images as the first plurality of images,
an order information receiving section which receives the order information transmitted by the order information transmitting section to the one of the first plurality of contact addresses,
an image searching section which searches, after the order information receiving section receives the order information, the second plurality of images stored in the second image storage section for other images related to the one of the first plurality of images represented by the order information, the other images being different from the one of the first plurality of images represented by the order information, and
an image releasing section which releases the other images found by the image searching section to the ordering party represented by the order information upon receiving a release permission, and
wherein
the order information receiving section conveys the order information to the image searching section,
the conveyance of the order information to the image searching section by the order information receiving section causes, without any additional instructions by the ordering party or a user of the image providing apparatus to search for the other images, the image searching section to search for the other images, and
when the order receiving section receives, after the other images found by the image searching section are released to the ordering party, an additional order from the ordering party for electronic-album-output of any of the other images, the order processing section charges the ordering party for the electronic-album-output of the any of the other images.

11. An image providing apparatus that is included in an image ordering system having an order management apparatus,
wherein the order management apparatus comprises:
a first image storage section which stores a first plurality of images,
an order receiving section which receives an order for electronic-album-output of one of the first plurality of images stored in the first image storage section from an ordering party,
an order information transmitting section which stores a first plurality of contact addresses by associating the first plurality of contact addresses with the first plurality of images respectively and transmits order information, which represents the one of the first plurality of images and the ordering party, to one of the first plurality of contact addresses which is associated with the one of the first plurality of images when the order receiving section receives the order for the one of the first plurality of images, and
an order processing section which charges the ordering party for the electronic-album-output of the one of the first plurality of images ordered by the ordering party,
wherein the image providing apparatus comprises:
a second image storage section which stores a second plurality of images which includes same images as the first plurality of images,
an order information receiving section which receives the order information transmitted by the order information transmitting section to the one of the first plurality of contact addresses,
an image searching section which searches, after the order information receiving section receives the order information, the second plurality of images stored in the second image storage section for other images related to the one of the first plurality of images represented by the order information, the other images being different from the one of the first plurality of images represented by the order information, and an image releasing section which releases the other images found by the image searching section to the ordering party represented by the order information upon receiving a release permission, and wherein the order information receiving section conveys the order information to the image searching section, the conveyance of the order information to the image searching section by the order information receiving section causes, without any additional instructions by the ordering party or a user of the image providing apparatus to search for the other images, the image searching section to search for the other images, and when the order receiving section receives, after the other images found by the image searching section are released to the ordering party, an additional order from the ordering party for electronic-album-output of any of the other images, the order processing section charges the ordering party for the electronic-album-output of the any of the other images.

12. An image ordering method comprising:

an order receiving step of receiving an order for electronic-album-output of one of a first plurality of images stored in a first image storage section from an ordering party, an order information transmitting step of storing a first plurality of contact addresses by associating the first plurality of contact addresses with the first plurality of images respectively and transmitting order information, which represents the one of the first plurality of images and the ordering party, to one of the first plurality of contact addresses which is associated with the one of the first plurality of images when the order receiving section receives the order for the one of the first plurality of images, an order processing step of charging the ordering party for the electronic-album-output of the one of the first plurality of images ordered by the ordering party, an order information receiving step of receiving the order information transmitted by the order information transmitting step to the one of the first plurality of contact addresses, an image searching step of searching by an image searching section, after the order information is received by the order information receiving step, a second plurality of images stored in a second image storage section which includes same images as the first plurality of images for other images related to the one of the first plurality of images represented by the order information, the other images being different from the one of the first plurality of images represented by the order information, an image releasing step of releasing the other images found by the image searching section to the ordering party represented by the order information upon receiving a release permission, wherein the order information is conveyed to the image searching section by the order information receiving step, the conveyance of the order information to the image searching section by the order information receiving step causes, without any additional instructions by the ordering party or a user of the image providing apparatus to search for the other images, the image searching section to search for the other images, and the image ordering method further comprises an additional order receiving step of receiving, when an additional order for electronic-album-output of any of the other images is sent from the ordering party after the other images found by the image searching section are released to the ordering party, the additional order, and additional charging step of charging the ordering party for the electronic-album-output of the any of the other images.

\* \* \* \* \*